US009790777B2

United States Patent
Nguyen et al.

(10) Patent No.: US 9,790,777 B2
(45) Date of Patent: Oct. 17, 2017

(54) FRACTURING FLUIDS COMPRISING FIBERS TREATED WITH CROSSLINKABLE, HYDRATABLE POLYMERS AND RELATED METHODS

(71) Applicant: Halliburton Energy Services, Inc., Houston, TX (US)

(72) Inventors: Philip D. Nguyen, Houston, TX (US); Loan K. Vo, Houston, TX (US)

(73) Assignee: Halliburton Energy Services, Inc., Houston, TX (US)

(*) Notice: Subject to any disclaimer, the term of this patent is extended or adjusted under 35 U.S.C. 154(b) by 0 days.

(21) Appl. No.: 14/784,322

(22) PCT Filed: Sep. 4, 2013

(86) PCT No.: PCT/US2013/057931
§ 371 (c)(1),
(2) Date: Oct. 14, 2015

(87) PCT Pub. No.: WO2015/034476
PCT Pub. Date: Mar. 12, 2015

(65) Prior Publication Data
US 2016/0053599 A1      Feb. 25, 2016

(51) Int. Cl.
*E21B 43/267*        (2006.01)
*C09K 8/68*          (2006.01)
(Continued)

(52) U.S. Cl.
CPC .............. *E21B 43/267* (2013.01); *C09K 8/68* (2013.01); *C09K 8/685* (2013.01); *C09K 8/80* (2013.01);
(Continued)

(58) Field of Classification Search
CPC ......... E21B 43/267; E21B 43/26; C09K 8/68; C09K 8/80; C09K 8/685; C09K 8/90; C09K 2208/08
USPC ..................... 166/308.1, 280.2, 305.1, 308.2
See application file for complete search history.

(56) References Cited

U.S. PATENT DOCUMENTS 5,330,005 A     7/1994   Card et al.
5,377,760 A *   1/1995   Merrill ............... C09K 8/512
                                              166/294
(Continued)

FOREIGN PATENT DOCUMENTS

EP       1368188 A1    12/2003
WO    2011075629 A1     6/2011
WO    2015034476 A1     3/2015

OTHER PUBLICATIONS

International Search Report and Written Opinion for PCT/US2013/057931 dated Jun. 24, 2014.

*Primary Examiner* — Silvana Runyan
(74) *Attorney, Agent, or Firm* — McDermott Will & Emery LLP

(57) ABSTRACT

A low-polymer-load fracturing fluid may include an aqueous carrier fluid, proppant, and polymer-treated degradable fibers. The polymer-treated degradable fibers may include degradable fibers that have been at least partially treated with a crosslinkable, hydratable polymer. In some instances, a method may involve placing a low-polymer-load fracturing fluid having an initial viscosity into a subterranean formation penetrated by a wellbore at a rate to generate pressure above fracture gradient to form or enhance at least one fracture in the formation matrix surrounding a designated portion of the wellbore; placing the low-polymer-load fracturing fluid into the fracture and allowing the polymer to crosslink and increase the initial viscosity to a gelled viscosity; and allowing the polymer-treated degradable fibers to degrade and reduce the gelled viscosity to a broken viscosity.

16 Claims, 2 Drawing Sheets

(51) Int. Cl.
  *C09K 8/90* (2006.01)
  *C09K 8/80* (2006.01)
  *E21B 43/26* (2006.01)

(52) U.S. Cl.
  CPC .............. *C09K 8/90* (2013.01); *E21B 43/26* (2013.01); *C09K 2208/08* (2013.01)

(56) References Cited

U.S. PATENT DOCUMENTS

| | | |
|---|---|---|
| 5,501,274 A | 3/1996 | Nguyen et al. |
| 6,528,157 B1 * | 3/2003 | Hussain .................. C09K 8/805 428/325 |
| 6,599,863 B1 | 7/2003 | Palmer et al. |
| 6,837,309 B2 | 1/2005 | Boney et al. |
| 7,565,929 B2 | 7/2009 | Bustos et al. |
| 8,042,614 B2 | 10/2011 | Sullivan et al. |
| 8,299,148 B2 | 10/2012 | Ikegame et al. |
| 8,360,149 B2 | 1/2013 | Hughes et al. |
| 2005/0059558 A1 * | 3/2005 | Blauch ...................... C09K 8/62 507/203 |
| 2006/0032633 A1 * | 2/2006 | Nguyen ................... C09K 8/68 166/280.2 |
| 2008/0245527 A1 * | 10/2008 | Leugemors ........... E21B 21/062 166/280.1 |
| 2009/0023614 A1 * | 1/2009 | Sullivan .................. C09K 8/68 507/214 |
| 2012/0189771 A1 | 7/2012 | Saini et al. |
| 2012/0267103 A1 | 10/2012 | Willberg et al. |
| 2013/0168096 A1 | 7/2013 | Parkhonyuk et al. |

\* cited by examiner

FRACTURING FLUIDS COMPRISING FIBERS TREATED WITH CROSSLINKABLE, HYDRATABLE POLYMERS AND RELATED METHODS

BACKGROUND

This disclosure relates to fracturing operations in subterranean formations, and more specifically, to low-polymer-load fracturing fluids that comprise degradable fibers treated with crosslinkable, hydratable polymers that form a gelled network in the fluid, and methods relating thereto.

Fracturing fluids are used in hydraulic fracturing operations in subterranean formations to stimulate the production of oil, gas and other fluids from the formation by means of increasing the permeability or conductivity thereof. Fracturing fluids have to be carefully designed to meet the rheological specifications necessary to ensure the desired performance of the fluid. In some instances, the fluids should have sufficient viscosity to create and propagate fractures in the formation matrix as well as carry and place proppant particulates into the fractures. Oftentimes this is achieved by including a polymeric gelling agent (e.g., biopolymers such as guar and xanthan or synthetic polymers such a polyacrylamides) in the fracturing fluid, which gels the fracturing fluid downhole to a gelled viscosity through formation of a viscous polymeric network in the fluid. A large concentration of polymer is often required to achieve the requisite viscosity, for example, 25 lbs./1000 gal up to 60 lbs./1000 gal of the fracturing fluid. These fluids are considered "high-polymer-load fracturing fluids," as that term is used herein. Particularly for high-temperature wells, it is often necessary to crosslink the polymer gelling agent (e.g., with a suitable crosslinking agent) to ensure that the gelled viscosity has sufficient strength and for fracturing applications. The resulting crosslinked polymer has an even higher gelled viscosity, which is thought to be even more effective at carrying proppant into the fractured formation. Borate crosslinking agents have been used extensively, typically in high pH fluids, for guar, guar derivatives and other galactomannans. Other crosslinking agents include, for example, titanium, chromium, iron, aluminum, and zirconium crosslinking agents.

In some instances, after the proppant particles are placed in the fractures, the viscosity of the gelled fluid used to carry the proppant particles is reduced by breaking the gelled fluid. Unfortunately, when the gelled fluid is broken downhole, these polymeric gelling agents leave gel residue in the propped fractures and/or in the formation that can reduce the formation's permeability and/or the conductivity of the propped fractures. Gel residue is often a product of an inefficient break, but also may be due to the inherent nature of the polymers, which is exacerbated by the high concentration used in common high-polymer-load fracturing fluids. Additionally, an increasing amount of insoluble residue may result if the gel has been crosslinked. Even in those breaks that are thought to be efficient (e.g., fully broken), insoluble residues that are part of the gel system may be left in the formation that can also foul the formation. Guar is an example of a commonly used polymeric gelling agent that is known to leave up to 10% insoluble residue in the formation causing formation damage (e.g., reduced formation permeability and fracture conductivity). These residues are very difficult to remove, and often are left in the formation, consequently adding to the well's negative environmental footprint.

Once the proppant particulates have been placed in the fractures, an ideal fracturing fluid should revert to a low viscosity fluid (i.e., a fluid having a lower viscosity than its gelled viscosity) that can easily be removed from the propped fracture(s) to facilitate high production of hydrocarbons without leaving insoluble products or residues that may impede the formation permeability or conductivity of the propped fractures to significantly impact the production of the well.

BRIEF DESCRIPTION OF THE DRAWINGS

The following figures are included to illustrate certain aspects of the present invention, and should not be viewed as exclusive embodiments. The subject matter disclosed is capable of considerable modifications, alterations, combinations, and equivalents in form and function, as will occur to those skilled in the art and having the benefit of this disclosure.

DETAILED DESCRIPTION

Figure 1:
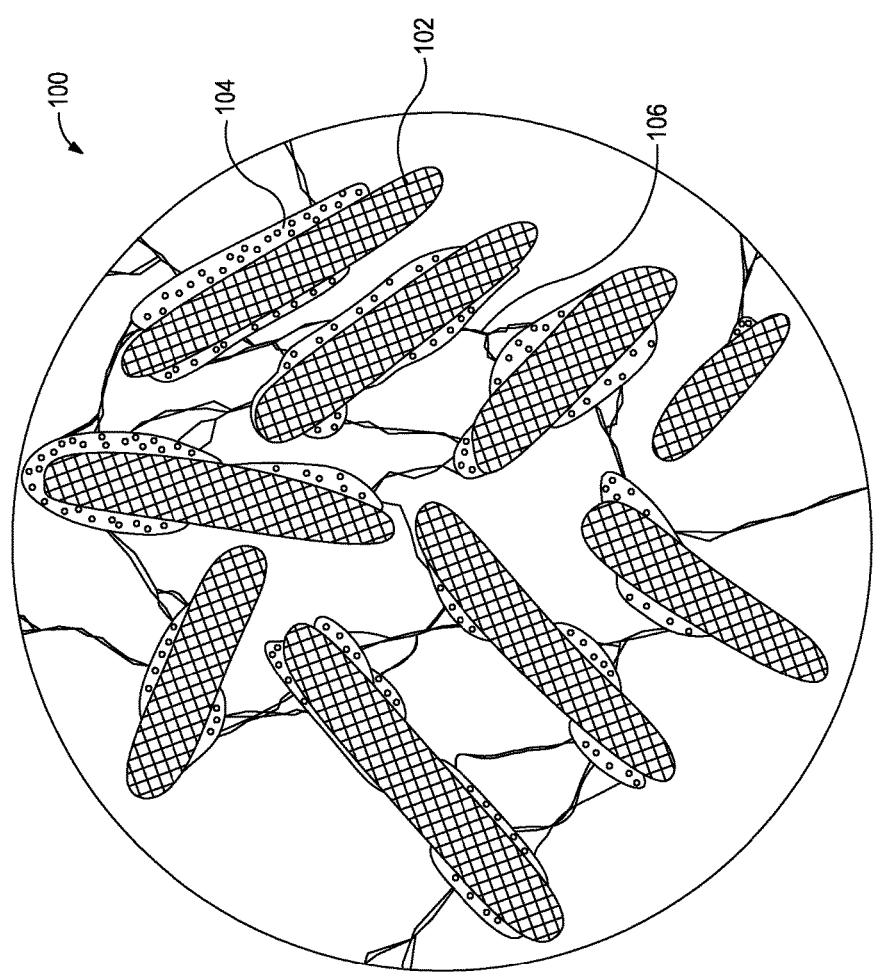
FIG. 1 illustrates the basics of the interactions between polymers on neighboring degradable fibers in an embodiment of a low-polymer-load fracturing fluid of this disclosure.

This disclosure relates to fracturing operations in subterranean formations, and more specifically, to low-polymer-load fracturing fluids that comprise degradable fibers treated with crosslinkable, hydratable polymers that form a gelled network in the fluid, and methods relating thereto. The features and advantages of the present invention will be readily apparent to those skilled in the art upon a reading of the description of the preferred embodiments that follows.

The low-polymer-load fracturing fluids provided herein are able to provide sufficient viscosity to carry proppant particulates efficiently and are able to break themselves through synergistic action of the components of the polymer-treated degradable fibers contained therein. This self-breaking results in a more efficient break of the fluids and less residue remaining in the formation matrix or in the propped fracture(s). As their name implies, these low-polymer-load fracturing fluids have a significantly decreased polymer load as compared to more traditional fracturing fluids. For example, a typical polymer loading in the low-polymer-load fracturing fluids disclosed herein is about 0.1 lbs./1000 gals to about 15 lbs./1000 gals. The low-polymer-load fracturing fluids described herein are "low-polymer-load" because the difference in polymer concentration can be an order of magnitude lower than conventional high-polymer-load fluids. A gelled network of polymer-treated degradable fibers creates the requisite gelled viscosity in the fluids when downhole to carry proppant particulates into the fractures. It should be noted that the viscosity of the fluid does not solely depend on the generated fluid viscosity per se, but rather on the mechanical network provided by the fibers and the crosslinked network created between the fibers by the polymer. The gelled viscosity is significantly greater than the initial viscosity of the fluid when mixed. As an example, the initial viscosity of a linear gel may be about 15 to 25 cP at 511 s$^{-1}$, but after crosslinking, the viscosity can increase to a few hundred or thousand cP at 511 s$^{-1}$. Because less polymer is used, these fluids are both economical and environmentally friendly.

To break (i.e., reduce the viscosity) the low-polymer-load fracturing fluids described herein downhole, the polymer-treated degradable fibers present synergistic benefits. The degradable fibers degrade over time and temperature, and their degradation products (e.g., acids) enhance the breaking of the polymer. Similarly, many of the polymers used to treat the degradable fibers are basic, which enhances degradation of the degradable fibers. In effect, the fluid becomes self-breaking through this dual-action. Notably, since the fibers are themselves degradable, the fibers do not leave behind undesirable residues, and because less polymer is used, even inherent insoluble residues are reduced as compared to high-polymer-load fracturing fluids.

Additionally, the polymer-treated degradable fibers during placement in the wellbore and formation matrix may provide fluid loss control for the low-polymer-load fracturing fluids during the fracturing operation even before the gelled viscosity is realized downhole. The polymer-treated degradable fibers are believed to control leak off, which is good from an operations and an environmental point of view. The less treatment fluid that is lost into the formation means that less overall treatment fluid is needed, which means that less of its components are needed, such as water. Additionally, controlling the leak off potential of the fluid means that there is less potential for the fluid to invade the formation matrix outside the zone of interest, e.g., into a neighboring water table.

Unless otherwise indicated, all numbers expressing quantities of ingredients, properties such as molecular weight, reaction conditions, and so forth used in the present specification and associated claims are to be understood as being modified in all instances by the term "about." Accordingly, unless indicated to the contrary, the numerical parameters set forth in the following specification and attached claims are approximations that may vary depending upon the desired properties sought to be obtained by the present invention. At the very least, and not as an attempt to limit the application of the doctrine of equivalents to the scope of the claim, each numerical parameter should at least be construed in light of the number of reported significant digits and by applying ordinary rounding techniques.

The low-polymer-load fracturing fluids of this disclosure comprise an aqueous carrier fluid and polymer-treated degradable fibers. Usually but optionally, the low-polymer-load fracturing fluids may further comprise proppant as well as additional additives such as external breakers, biocides, corrosion inhibitors, pH-adjusting agents, chelating agents, and the like.

The degradable fibers are at least partially treated with at least a thin film of crosslinkable, hydratable polymer to form the "polymer-treated degradable fibers." No particular degree of treatment with the film of crosslinkable, hydratable polymer is implied by the term "treated." When downhole, the polymer-treated degradable fibers hydrate and the polymers crosslink at their binding sites forming a mesh network that can build a viscous network in the fluid to carry the proppant particulates into the fractures. The use of degradable fibers in hydraulic fracturing of a formation provides for, at the beginning, carrying the proppant and obtaining a compacted proppant pack, which prevents the fracture from closing. Less polymer is used because the polymer itself is not the viscosifying agent (or gelling agent) for the entire fracturing fluid. Rather, the mesh network created amongst and between the fibers through the binding of the polymers on the surfaces of the fibers creates this increased gelled viscosity.

FIG. 1 illustrates the basics of the interactions between polymers on neighboring polymer-treated degradable fibers. Shown at 100 is a magnified portion of the mesh network where the polymer-treated degradable fibers 102 have crosslinkable, hydratable polymer 104 on at least a portion of their surface. The mesh network also includes crosslinks 106 between the crosslinkable, hydratable polymer 104 on adjacent degradable fibers 102.

Suitable degradable fibers for use in the polymer-treated degradable fibers described herein are made from degradable polymers. Nonlimiting examples of degradable polymers may include, but are not limited to, homopolymers, random, block, graft, and star- and hyper-branched aliphatic polyesters. Polycondensation reactions, ring-opening polymerizations, free radical polymerizations, anionic polymerizations, carbocationic polymerizations, coordinative ring-opening polymerizations, and any other suitable processes may prepare suitable degradable polymers. One of the important characteristics of suitable degradable polymers is that they are melt or solution processable. Specific examples of suitable degradable polymers include aliphatic polyesters; poly(lactides); poly(glycolides); poly($\epsilon$-caprolactones); poly(hydroxybutyrates); polyanhydrides; aliphatic polycarbonates; poly(orthoesters); poly(amides); poly(urethanes); poly(hydroxy ester ethers); and poly(phosphazenes). Derivatives and combinations of these may also be suitable. Other degradable polymers that are subject to hydrolytic degradation also may be suitable. A specific example of a fiber that is suitable for use as described herein is polylactic acid (PLA) fiber, which may be appropriate due to its mechanical and degradation properties, as well as due to its availability and the highest efficiency compared with other degradable fibers. Polylactic acid (PLA) fibers have been shown to degrade into soluble materials under temperature and with time.

One guideline for choosing which degradable fiber to use in a particular application is what degradation products will result. The differing molecular structures of the degradable fibers that are suitable for the present embodiments give a wide range of possibilities regarding regulating the degradation rate of the degradable material and its degradation products. For instance, some may form an acid upon degradation, which may be desirable, for example, to enhance the breaking of the crosslinkable, hydratable polymers. Importantly, these degradation products should not adversely affect other operations or components in the well.

The temperature of the wellbore (e.g., the bottom hole temperature) will likely be an important factor in dictating the type of degradable fiber used in combination with the crosslinkable, hydratable polymer.

Of these suitable degradable polymers for use in or as the degradable fibers, aliphatic polyesters are preferred. Of the suitable aliphatic polyesters, polyesters of $\alpha$ or $\beta$ hydroxy acids are preferred. Poly(lactide) is most preferred. Poly (lactide) is synthesized either from lactic acid by a condensation reaction or more commonly by ring-opening polymerization of cyclic lactide monomer. The lactide monomer exists generally in three different forms: two stereoisomers L- and D-lactide and D,L-lactide (meso-lactide). The chirality of the lactide units provides a means to adjust, inter alia, degradation rates, as well as physical and mechanical properties after the lactide is polymerized. Poly(L-lactide), for instance, is a semicrystalline polymer with a relatively slow hydrolysis rate. This could be desirable in applications of the present invention where slow degradation of the self-degrading fiber is desired. Poly(D,L-lactide) is an amorphous polymer with a much faster hydrolysis rate. This may be suitable for other applications of the methods and compositions of the present invention. The stereoisomers of lactic acid may be used individually or combined for use in the compositions and methods of the present invention. Additionally, they may be copolymerized with, for example, glycolide or other monomers like ε-caprolactone, 1,5-dioxepan-2-one, trimethylene carbonate, or other suitable monomers to obtain polymers with different properties or degradation times. Additionally, the lactic acid stereoisomers can be modified by blending high and low molecular weight polylactide or by blending polylactide with other aliphatic polyesters. For example, the degradation rate of the PLA may be affected by blending high and low molecular weight lactide, by using mixture of polylactide and lactide monomer or by blending polylactide with other aliphatic polyesters.

The physical properties of degradable polymers (and, therefore, at least in part, the polymer-treated degradable fibers) may depend on several factors such as the composition of the repeat units, flexibility of the chain, presence of polar groups, molecular mass, degree of branching, crystallinity, orientation, etc. For example, short chain branches reduce the degree of crystallinity of polymers while long chain branches lower the melt viscosity and impart, inter alia, extensional viscosity with tension-stiffening behavior. The properties of the particular polymer utilized can be further tailored by blending, and copolymerizing it with another polymer, or by a change in the macromolecular architecture (e.g., hyper-branched polymers, star-shaped, or dendrimers, etc.). The properties of any such suitable degradable polymers (such as hydrophilicity, rate of biodegradation, etc.) can be tailored by introducing functional groups along the polymer chains. One of ordinary skill in the art with the benefit of this disclosure will be able to determine the appropriate functional groups to introduce to the polymer chains to achieve the desired effect.

Fiber length, thickness, density, and concentration may be important variables when choosing the appropriate polymer-treated degradable fibers described herein for a particular application. The degradable fibers may have any suitable physical dimensions. The behavior of the polymer-treated degradable fibers in a chosen application may be manipulated by changing the characteristics of the degradable fibers, such as shape, size, etc. In some embodiments, the polymer-treated degradable fibers may have an average or effective diameter (number average) of about 2 microns to about 200 microns, and a length of at least about 1 millimeter. The length of the fibers is limited only by the practical implications of handling, pumping, manufacturing, and the like. In some embodiments, a maximum length for the polymer-treated degradable fibers may be about 100 millimeters. An aspect ratio of greater than about 100 may be preferred in some applications. Additionally, the polymer-treated degradable fibers may have straight, crimped, curved, spiral-shaped, or other three-dimensional geometries if desired.

As described herein, the polymer-treated degradable fibers comprise degradable fibers at least partially treated with crosslinkable, hydratable polymers. The crosslinkable, hydratable polymers may include any crosslinkable, hydratable polymer that is suitable for use in a fracturing fluid. For example, both biopolymers and synthetic polymers are suitable. Suitable biopolymers may include, but are not limited to, xanthan, scleroglucan, succinoglycan, cellulose and its derivatives (e.g., hydroxyethylcellulose), and guar and its derivatives (e.g., hydroxypropyl guar). Suitable synthetic polymers include polyacrylamides. Combinations of polymers may also be suitable. Synthetic polymers may be preferred when the fracturing operation is being carried out in a high temperature wellbore (e.g., 350° F. or more). Specific examples of suitable crosslinkable, hydratable polymers include, but are not limited to, guar, hydroxypropyl guar, carboxymethyl guar, carboxymethylhydroxyethyl guar, hydroxyethyl cellulose, carboxymethylhydroxyethyl cellulose, hydroxypropyl cellulose, xanthan, and polyacrylamides. Because synthetic polymers are generally harder to break downhole than biopolymers, synthetic polymers are less preferable than biopolymers for use in the low-polymer-load fracturing fluids described herein. Although the acids generated from the degradation of the degradable polymer will aid breaking of the synthetic polymer, an external breaker may be needed to break fluids formed with synthetic polymers to achieve the desired break within a reasonable period of time.

The crosslinkable, hydratable polymer may be present in an amount sufficient to treat the surface area of the degradable polymers as described above and in a sufficient amount to provide sufficient crosslinking between the binding sites of the polymers to form the mesh network. In some embodiments, the crosslinkable, hydratable polymer may be present in an amount in the range of from about 0.01% to about 0.1% by weight of the low-polymer-load fracturing fluid. In certain embodiments, the crosslinkable, hydratable polymer may be present in an amount in the range of from about 0.1 lbs/1000 gallons to 15 lbs/1000 gallons, preferably 5 lbs/1000 gallons to 10 lbs/1000 gallons. As has been described above, less crosslinkable, hydratable polymer is required because the fibers plus some binding through surface polymers build the mesh network in the fluid to create the requisite viscosity for the fracturing operation. (See FIG. 1.)

An example of a preferred polymer-treated degradable fiber is a polylactic acid fiber treated with guar or a guar derivative at a concentration of about 5 lbs/1000 gallon to about 50 lbs/1000 gallons, more preferably 15 lbs/1000 gallons to 30 lbs/1000 gallons.

As stated above, the polymer-treated degradable fibers used in the low-polymer-load fracturing fluids of this disclosure are treated with a crosslinkable, hydratable polymer so that a film or coating forms on at least a portion of the fibers' surfaces. This film can be formed through a coating process, preferably performed at the time the degradable fibers are manufactured, through a spray-coating process. Alternatively, the degradable fibers may be treated after manufacture, for example, by a purchaser of the degradable fibers at the purchaser's facility. A spray-coating process may be used in this instance as well. Other treating processes may be useful as well as long as the degradable fibers do not agglomerate into a big glob of material. That is, the degradable fibers, preferably, need to stay individualized. Preferably, about 10% to about 40% of the surface area of the degradable fibers is covered by the polymer. That is, the polymer-treated degradable fibers may be only partially coated.

In alternative embodiments, the degradable fibers may be suspended in a highly viscous concentrate that includes the crosslinkable, hydratable polymer. Using the degradable fibers in this form may alleviate handling concerns associated with using the fibers. In an example of a concentrate, the degradable fibers may comprise from about 0.5% to about 10% by volume of the concentrate and enough crosslinkable, hydratable polymer to treat the surface area of the degradable fibers to the desired level. Given that the degradable fibers have a large amount of surface area, the amount of crosslinkable, hydratable polymer to include may be about 20% by volume of the concentrate. A carrier fluid such as water may also be included, for example, in an amount of 60% of less by volume of the concentrate. Optionally, a dispersant may be included as well. If used, the dispersant may be present in an amount of about 1% to about 2% by volume of the concentrate. Optionally, a biocide may be recommended to prevent degradation of the polymer-treated degradable fibers by microbials.

In a spray-coating embodiment, the degradable fibers are spray-coated with a solution comprising the crosslinkable, hydratable polymer. The coating or film formed should cover enough of the surface area of the fibers to allow for efficient hydration and crosslinking of the polymer binding sites between the fibers, but not so much that the degradable fibers agglomerate into a large glob of material. Preferably, about 10% to about 40% of the surface area of the degradable fibers is covered by the polymer. In some instances, the resulting polymer-treated degradable fibers can be bagged in dry form. In other instances, the resulting polymer-treated degradable fibers are mixed with an aqueous-based gel to form a highly viscous concentrate.

At the well site, a concentrate comprising the polymer-treated degradable fibers (or the polymer-treated degradable fibers themselves in dry form) may be metered into a mixing tub with the other components of a low-polymer-load fracturing fluid, e.g., an aqueous carrier fluid, proppant, and any other optional additives. The resulting low-polymer-load fracturing fluid may be pumped downhole on-the-fly to create or enhance a fracture in the desired formation matrix surrounding the wellbore.

A variety of carrier fluids may be included in the low-polymer-load fracturing fluids used in the methods described herein. For example, the carrier fluid may comprise water, acids, oils, or mixtures thereof. In certain embodiments wherein the carrier fluid comprises water, the water used may be fresh water, salt water (e.g., water containing one or more salts dissolved therein), brine (e.g., saturated salt water), or seawater. Generally, the water may be from any source, provided that it does not contain an excess of compounds that may adversely affect other components in the treatment fluid. Examples of suitable acids include, but are not limited to, hydrochloric acid, acetic acid, formic acid, citric acid, or mixtures thereof. In certain embodiments, the carrier fluid may further comprise a gas (e.g., nitrogen, or carbon dioxide). Generally, the carrier fluid is present in the low-polymer-load fracturing fluids described herein in an amount in the range of from about 25% to about 99% by weight of the low-polymer-load fracturing fluid.

Optionally, the low-polymer-load fracturing fluids described herein may comprise proppant particulates. In certain optional embodiments where proppant particulates are present, the proppant particulates generally are of a size such that formation fines that may migrate with produced fluids are prevented from being produced from the subterranean zone. Any suitable proppant particulates may be used, including, inter alia, graded sand, bauxite, ceramic materials, glass materials, walnut hulls, polymer beads, and the like. An example of suitable proppant particulates are commercially available from CarboCeramics, Inc., of Irving, Tex., under the trade name "CARBOLITE®." Generally, the proppant particulates will have a size in the range of from about 4 to about 400 mesh, U.S. Sieve Series. In certain embodiments, the proppant particulates comprise graded sand having a particle size in the range of from about 10 to about 70 mesh, U.S. Sieve Series. In some embodiments, mixtures of proppant particulates having different sizes may be used to form an optimum proppant pack for any given fracture. The particle size distribution of the proppant particulates will depend, inter alia, on the configuration of the fracture as well as the types of proppant particulates used. One having ordinary skill in the art with the benefit of this disclosure will be able to determine the particle size distribution for an optimum proppant pack for use in conjunction with the fluids of this disclosure. In certain embodiments, the proppant particulates may be at least partially coated with a curable resin, relative permeability modifiers, tackifying agents, or some other flowback control agent or formation fine control agent. In certain embodiments, the proppant particulates may include 20/40 CARBOLITE® proppant particulates. In certain embodiments wherein proppant particulates are present in the treatment fluids, the proppant particulates may be present in an amount in the range of from about 0.01% to about 75% by weight of the low-polymer-load fracturing fluid. In certain embodiments wherein proppant particulates are present in the low-polymer-load fracturing fluids, the proppant particulates may be present in an amount in the range of from about 12% to about 65% by weight of the low-polymer-load fracturing fluid.

At low temperatures (e.g., 82° C. or below, especially between 10° C. and 50° C.), the degradable fibers may degrade too slowly to create the desired effect. To enhance the degradation, especially at low temperatures, optionally, the low-polymer-load treatment fluids described herein may comprise a pH-adjusting agent to enhance the degradation rate of the polymer-treated degradable fibers. Suitable pH-adjusting agents should adjust the pH value of the fluid, which in some embodiments should enhance the process of degradation of degradable fibers in the fluid during treating the wellbore. One potential purpose of the pH-adjusting agent may be to provide the hydrolysis of the polymer-treated degradable fibers at low temperature, such as, for example, less than about 82° C. (e.g., about 10° C. to about 50° C.). It may be advisable to adjust the pH of the fluid to enhancing the crosslinking reaction. One of ordinary skill in the art with the benefit of this disclosure should be able to recognize when a pH adjuster would be appropriate to include.

Suitable pH-adjusting agents will vary with a specific degradable fiber selected, but generally may include those agents which are strongly alkaline materials that may provide and maintain a high pH environment. In some embodiments, the pH-adjusting agents may provide the fluid a pH of 9 or more. Examples of such strongly alkaline materials include, but are not limited to, metal hydroxides, metal oxides, calcium hydroxide, metal carbonates or bicarbonates, and the like. The alkali and alkaline earth metal may be selected from sodium, magnesium, potassium, and calcium. For example, the strong alkaline substance can be CaO, $Ca(OH)_2$, MgO, NaOH and KOH. In some embodiments, the pH-adjusting agents may include any combination of these, for example, at least two of these components. The pH-adjusting agents may also contain amines base additives such as urea and derivatives thereof, such as dimethylolurea, 1,1-diethylurea, 1,1,3,3-tetramethylurea, 1,3-diethylurea, hydroxyurea, 1,3-diallylurea, ethylurea, 1,1-dimethylurea, as well as nucleophilic amines, such as 4-dimethylaminopyridine (DMAP) and 1,8-diazabicylo[5.4.0]undec-7-ene (DBU). In one embodiment, the pH-adjusting agent may also contain a combination of amines with potassium carbonate ($K_2CO_3$).

The amount of the pH-adjusting agent to include in a low-polymer-load fracturing fluid of this disclosure will depend on the nature of the fluid, the nature of the subterranean formation, and the desired degradation rate of the polymer-treated degradable fibers. In some instances, more of the pH-adjusting agent may be needed. Generally, the amount of pH-adjusting agent to include will range between about 0.01% and 5% by weight of low-polymer-load fracturing fluid.

Optionally, a chelating agent (or salts thereof) may be included in the low-polymer-load fracturing fluids, for example, to sequester ions that may result in precipitation. However, one should note that many of the used chelating compounds are acids, and their introduction into the fluids can reduce the pH value of the treatment fluid and, therefore, may enhance the degradation of the degradable fibers. Examples of suitable chelating agents may include ethylenediaminetetraacetic acid (EDTA) and salts thereof. In a specific embodiment, salts of ethylenediaminetetraacetic acid includes mono-, di-, tri- and tetra-sodium salts, and mono-, di-, tri- and tetra-potassium salts. In another embodiment, the precipitation-control agent may be amino trimethylene phosphonic acid (ATMP) and salts thereof. In a specific embodiment, salts of amino trimethylene phosphonic acid include mono-, di-, tri-, tetra-, penta- and hexa-sodium salts, mono-, di-, tri-, tetra-, penta- and hexa-potassium salts. In some embodiments where a pH-adjusting agent and a chelating agent are used jointly, the weight ratio of the pH-adjusting agent and the chelating agent should exceed 1:1 such as, for example, from about 1:1 to about 200:1 or from 2:1 to 50:1. Other chelating agents may be suitable as well. Biodegradable chelating agents are preferred.

Optionally, the low-polymer-load fracturing fluids described herein may comprise additional additives as deemed appropriate by one skilled in the art, with the benefit of this disclosure. Examples of such additives include, but are not limited to, de-emulsifiers, surfactants, salts, cross-linking agents, buffers, clay inhibitors, iron-control additives, external breakers, biocides, caustic, relative permeability modifiers, or the like. An example of a suitable de-emulsifier is commercially available from Halliburton Energy Services, Inc., under the trade name "LO-SURF 300." An example of a suitable caustic source is commercially available from Halliburton Energy Services, Inc., under the trade name "MO-67." An example of a suitable buffer comprises ammonium acetate and is commercially available from Halliburton Energy Services, Inc., under the trade name "BA-20." An example of a suitable crosslinking agent is commercially available from Halliburton Energy Services, Inc., under the trade name "CL-28M." An example of a suitable breaker is commercially available from Halliburton Energy Services, Inc., under the trade name "VICON NF." Examples of suitable bactericides are commercially available from Halliburton Energy Services, Inc., under the trade names "BE-3S" and "BE-6." An example of a suitable relative permeability modifier is commercially available from Halliburton Energy Services, Inc., under the trade name "KW FRAC FLUID."

Embodiments disclosed herein include methods that include the steps of: providing a low-polymer-load fracturing fluid comprising an aqueous carrier fluid, proppant, and polymer-treated degradable fibers that have been at least partially treated with a polymer on the fiber surface, the low-polymer-load fracturing fluid having an initial viscosity; placing the low-polymer-load fracturing fluid into a subterranean formation penetrated by a wellbore at a rate to generate pressure above fracture gradient to form or enhance at least one fracture in the formation matrix surrounding a designated portion of the wellbore; placing the low-polymer-load fracturing fluid into the fracture and allowing the polymer to crosslink to form crosslinks between the polymer-treated degradable fibers so as to increase the viscosity of the low-polymer-load fracturing fluid to a gelled viscosity, the gelled viscosity being higher than the initial viscosity; and allowing the polymer-treated degradable fibers to degrade so that the viscosity of the low-polymer-load fracturing fluid is reduced to a broken viscosity, the broken viscosity being lower than the gelled viscosity of the low-polymer-load fracturing fluid. Through the reduction of the viscosity of the low-polymer-load fracturing fluid in the fracture the conductivity through the fracture may be enhanced. The method may further include before providing the low-polymer-load fracturing fluid, providing a highly viscous concentrate that comprises the polymer-treated degradable fibers and an aqueous carrier fluid and mixing the polymer-treated degradable fibers to form a low-polymer-load fracturing fluid. This may be done at the well site or at a locate remote from the well site. In other embodiments, the method may include before providing the low-polymer-load fracturing fluid, providing spray-coated polymer-treated degradable fibers and providing an aqueous carrier fluid, and mixing the spray-coated polymer-treated degradable fibers with the aqueous carrier fluid to form a low-polymer-load fracturing fluid. This may be done at the well site or at a locate remote from the well site.

Embodiments disclosed herein include a method provided herein the steps may include: providing a low-polymer-load fracturing fluid comprising an aqueous carrier fluid, optionally proppant, and polymer-treated degradable fibers that have been at least partially treated with a polymer on the fiber surface; introducing the low-polymer-load fracturing fluid into a subterranean formation penetrated by a wellbore at a pressure sufficient to create or enhance a fracture in the subterranean formation; and allowing the low-polymer-load fracturing fluid to form a proppant matrix in the fracture.

Any such embodiments may have one or more of the following additional elements in any combination: a polymer load of about 5 lbs/1000 gallons to about 15 lbs/1000 gallons; a gelled viscosity attributable to a mesh network; the polymer-treated degradable fibers comprising a fiber that comprises a degradable polymer selected from the group consisting of: an aliphatic polyester; a poly(lactide); a poly (glycolide); a poly(ε-caprolactone); a poly(hydroxybutyrate); a polyanhydride; an aliphatic polycarbonate; a poly (orthoester); a poly(amide); a poly(urethane); a poly (hydroxy ester ether); and a poly(phosphazene); the polymer-treated degradable fibers have an average or effective diameter of about 2 microns to about 200 microns, and a length of at least about 1 millimeter; the crosslinkable, hydratable polymer comprises a polymer selected from the group consisting of: a biopolymer, a synthetic polymer, xanthan, scleroglucan, succinoglycan, cellulose, a cellulose derivative, hydroxyethylcellulose, guar, a guar derivative, hydroxypropyl guar, carboxymethyl guar, carboxymethyl-hydroxyethyl guar, hydroxyethyl cellulose, carboxymethyl-hydroxyethyl cellulose, hydroxypropyl cellulose a polyacrylamide, and any combination thereof; the low-polymer-load fracturing fluid further comprises an external breaker, a pH-adjusting agent, a chelating agent, a biocide, a de-emulsifier, a surfactant, a salt, a crosslinking agent, a buffer, a clay inhibitor, an iron-control additive, an external breaker, caustic, a relative permeability modifiers, and any combination thereof; the carrier fluid comprises a fluid selected from the group consisting of: a gas, water, fresh water, salt water, brine and seawater; and the proppant particulates comprise proppant particulates selected from the group consisting of: graded sand, bauxite, a ceramic material, a glass material, a walnut hull, a polymer bead, and any combination thereof.

A. Any such embodiments may have one or more of the following additional elements in any combination: a polymer load of about 0.1 lbs/1000 gallons to about 15 lbs/1000 gallons; a gelled viscosity attributable to a mesh network; the polymer-treated degradable fibers comprising a fiber that comprises a degradable polymer selected from the group consisting of: an aliphatic polyester; a poly(lactide); a poly(glycolide); a poly($\epsilon$-caprolactone); a poly(hydroxybutyrate); a polyanhydride; an aliphatic polycarbonate; a poly(orthoester); a poly(amide); a poly(urethane); a poly(hydroxy ester ether); and a poly(phosphazene). Derivatives and combinations of these may also be appropriate.

B. In any such embodiments, the polymer-treated degradable fibers have an average or effective diameter of about 2 microns to about 200 microns, and a length of at least about 1 millimeter.

C. In any such embodiments, the crosslinkable, hydratable polymer comprises a polymer selected from the group consisting of: a biopolymer, a synthetic polymer, xanthan, scleroglucan, succinoglycan, cellulose, a cellulose derivative, hydroxyethylcellulose, guar, a guar derivative, hydroxypropyl guar, carboxymethyl guar, carboxymethylhydroxyethyl guar, hydroxyethyl cellulose, carboxymethylhydroxyethyl cellulose, hydroxypropyl cellulose a polyacrylamide, and any combination thereof. Derivatives may also be suitable.

D. In any such embodiment, the low-polymer-load fracturing fluid further comprises an external breaker, a pH-adjusting agent, a chelating agent, a biocide, a de-emulsifier, a surfactant, a salt, a crosslinking agent, a buffer, a clay inhibitor, an iron-control additive, an external breaker, caustic, a relative permeability modifiers, and any combination thereof; the carrier fluid comprises a fluid selected from the group consisting of: a gas, water, fresh water, salt water, brine and seawater; and the proppant particulates comprise proppant particulates selected from the group consisting of: graded sand, bauxite, a ceramic material, a glass material, a walnut hull, a polymer bead, and any combination thereof.

Each of embodiments A, B, C and D may have one or more of the following additional elements in any combination: a polymer load of about 5 lbs/1000 gallons to about 15 lbs/1000 gallons; a gelled viscosity attributable to a mesh network; the polymer-treated degradable fibers comprising a fiber that comprises a degradable polymer selected from the group consisting of: an aliphatic polyester; a poly(lactide); a poly(glycolide); a poly($\epsilon$-caprolactone); a poly(hydroxybutyrate); a polyanhydride; an aliphatic polycarbonate; a poly(orthoester); a poly(amide); a poly(urethane); a poly(hydroxy ester ether); and a poly(phosphazene); the polymer-treated degradable fibers have an average or effective diameter of about 2 microns to about 200 microns, and a length of at least about 1 millimeter; the crosslinkable, hydratable polymer comprises a polymer selected from the group consisting of: a biopolymer, a synthetic polymer, xanthan, scleroglucan, succinoglycan, cellulose, a cellulose derivative, hydroxyethylcellulose, guar, a guar derivative, hydroxypropyl guar, carboxymethyl guar, carboxymethylhydroxyethyl guar, hydroxyethyl cellulose, carboxymethylhydroxyethyl cellulose, hydroxypropyl cellulose a polyacrylamide, and any combination thereof; the low-polymer-load fracturing fluid further comprises an external breaker, a pH-adjusting agent, a chelating agent, a biocide, a de-emulsifier, a surfactant, a salt, a crosslinking agent, a buffer, a clay inhibitor, an iron-control additive, an external breaker, caustic, a relative permeability modifiers, and any combination thereof; the carrier fluid comprises a fluid selected from the group consisting of: a gas, water, fresh water, salt water, brine and seawater; and the proppant particulates comprise proppant particulates selected from the group consisting of: graded sand, bauxite, a ceramic material, a glass material, a walnut hull, a polymer bead, and any combination thereof.

Embodiments disclosed herein include a system comprising: a mixing tank, the mixing tank comprising a low-polymer-load fracturing fluid that comprises an aqueous carrier fluid, optionally proppant, and a mesh network created by polymers crosslinking between and/or among polymer-treated degradable fibers that have been at least partially treated with a polymer on the fiber surface; a well head; a tubular having an orifice through which the low-polymer-load fracturing fluid can be placed into a subterranean formation matrix; and a high pressure pump.

One or more illustrative embodiments incorporating the invention disclosed herein are presented herein. It is understood that in the development of an actual embodiment incorporating the present invention, numerous implementation-specific decisions must be made to achieve the developer's goals, such as compliance with system-related, business-related, government-related and other constraints, which vary by implementation and from time to time. While a developer's efforts might be complex and time-consuming, such efforts would be, nevertheless, a routine undertaking for those of ordinary skill the art having benefit of this disclosure.

An example of a low-polymer load fracturing fluid of this disclosure includes a low-polymer-load fracturing fluid comprising an aqueous carrier fluid, optionally proppant, and a mesh network created by polymers crosslinking between and/or among polymer-treated degradable fibers that have been at least partially treated with a polymer on the fiber surface.

The term "between and/or among" as used herein to describe the crosslinks formed between the polymers on the degradable fibers does not imply any particular structure to the crosslinks nor density of the crosslinks. The term merely reflects crosslinks generally. An example, but not limiting, is shown in FIG. 1 at crosslink 106.

In various embodiments, systems configured for delivering the low-polymer-load fracturing fluids described herein to a downhole location are described. In various embodiments, the systems can comprise a pump fluidly coupled to a tubular, the tubular containing a low-polymer-load fracturing fluid comprising an aqueous carrier fluid and polymer-treated degradable fibers, and optionally proppant and other additives. The pump may be a high pressure pump in some embodiments. As used herein, the term "high pressure pump" will refer to a pump that is capable of delivering a fluid downhole at a pressure of about 1000 psi or greater. A high pressure pump may be used when it is desired to introduce the treatment fluid to a subterranean formation at or above a fracture gradient of the subterranean formation, but it may also be used in cases where fracturing is not desired. In some embodiments, the high pressure pump may be capable of fluidly conveying particulate matter, such as proppant particulates, into the subterranean formation. Suitable high pressure pumps will be known to one having ordinary skill in the art and may include, but are not limited to, floating piston pumps and positive displacement pumps.

In some embodiments, the systems described herein can further comprise a mixing tank that is upstream of the pump and in which the low-polymer-load fracturing fluid is formulated. In various embodiments, the pump (e.g., a low pressure pump, a high pressure pump, or a combination thereof) may convey the low-polymer-load fracturing fluid from the mixing tank or other source of the low-polymer-load fracturing fluid to the tubular. In other embodiments, however, the low-polymer-load fracturing fluid can be formulated offsite and transported to a worksite, in which case the low-polymer-load fracturing fluid may be introduced to the tubular via the pump directly from its shipping container (e.g., a truck, a railcar, a barge, or the like) or from a transport pipeline. In either case, the low-polymer-load fracturing fluid may be drawn into the pump, elevated to an appropriate pressure, and then introduced into the tubular for delivery downhole.

Figure 2:
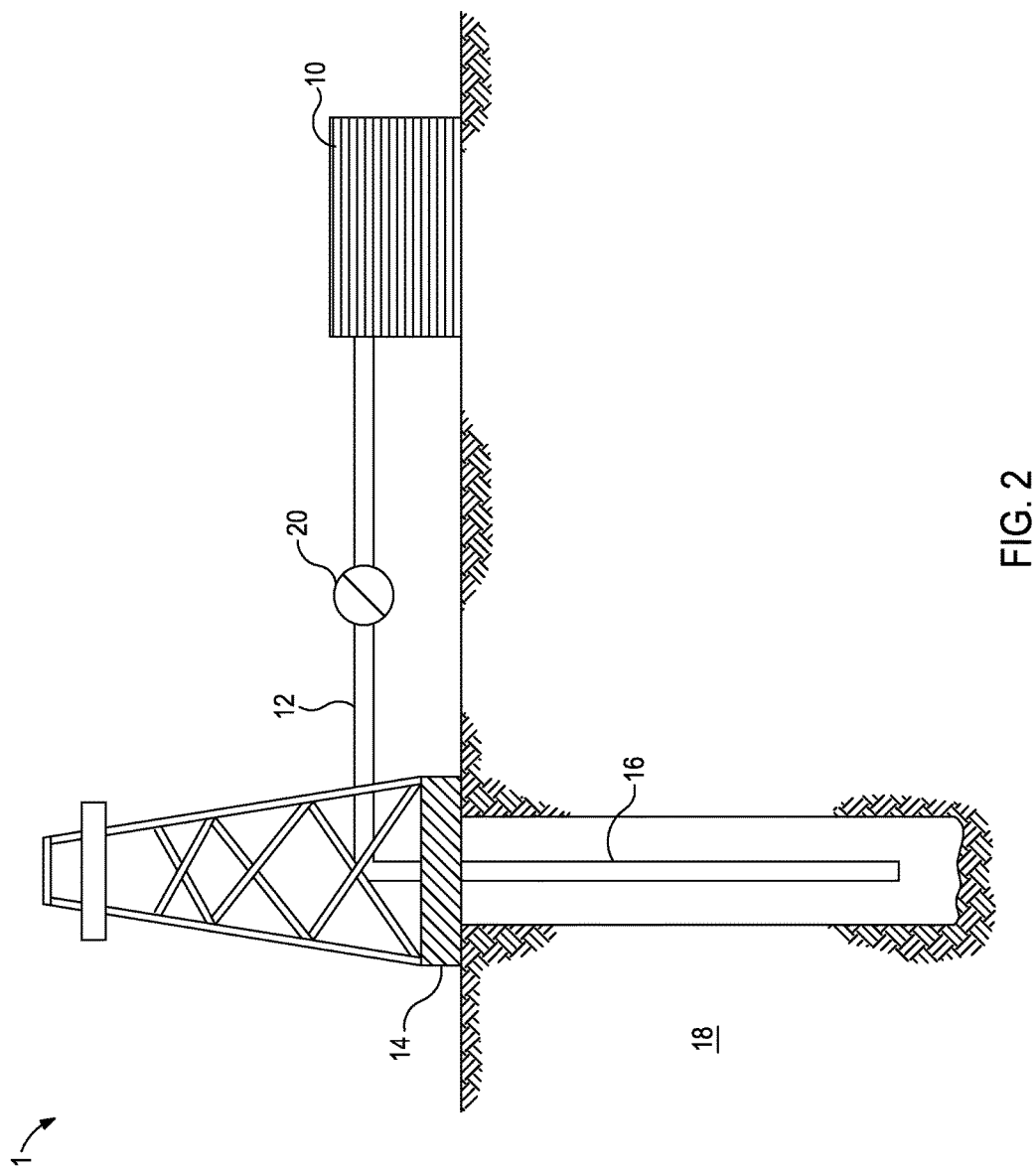
FIG. 2 illustrates a system that may be used in conjunction with the low-polymer-load fracturing fluids described herein.

FIG. 2 shows an illustrative schematic of a system that can deliver treatment fluids of the present invention to a downhole location, according to one or more embodiments. It should be noted that while FIG. 2 generally depicts a land-based system, it is to be recognized that like systems may be operated in subsea locations as well. As depicted in FIG. 2, system 1 may include mixing tank 10, in which a low-polymer-load fracturing fluids of this disclosure may be formulated. The low-polymer-load fracturing fluid may be conveyed via line 12 to wellhead 14, where the low-polymer-load fracturing fluid enters tubular 16, tubular 16 extending from wellhead 14 into subterranean formation 18. Upon being ejected from tubular 16, the low-polymer-load fracturing fluid may subsequently penetrate into subterranean formation 18 at a pressure sufficient to enhance or create a fracture therein. Pump 20 may be configured to raise the pressure of the low-polymer-load fracturing fluid to a desired degree before its introduction into tubular 16. It is to be recognized that system 1 is merely exemplary in nature and various additional components may be present that have not necessarily been depicted in FIG. 2 in the interest of clarity. Non-limiting additional components that may be present include, but are not limited to, supply hoppers, valves, condensers, adapters, joints, gauges, sensors, compressors, pressure controllers, pressure sensors, flow rate controllers, flow rate sensors, temperature sensors, and the like.

Although not depicted in FIG. 2, the low-polymer-load fracturing fluid may, in some embodiments, flow back to wellhead 14 and exit subterranean formation 18. In some embodiments, the low-polymer-load fracturing fluid that has flowed back to wellhead 14 may subsequently be recovered and recirculated to subterranean formation 18.

It is also to be recognized that the disclosed treatment fluids may also directly or indirectly affect the various downhole equipment and tools that may come into contact with the treatment fluids during operation. Such equipment and tools may include, but are not limited to, wellbore casing, wellbore liner, completion string, insert strings, drill string, coiled tubing, slickline, wireline, drill pipe, drill collars, mud motors, downhole motors and/or pumps, surface-mounted motors and/or pumps, centralizers, turbolizers, scratchers, floats (e.g., shoes, collars, valves, etc.), logging tools and related telemetry equipment, actuators (e.g., electromechanical devices, hydromechanical devices, etc.), sliding sleeves, production sleeves, plugs, screens, filters, flow control devices (e.g., inflow control devices, autonomous inflow control devices, outflow control devices, etc.), couplings (e.g., electro-hydraulic wet connect, dry connect, inductive coupler, etc.), control lines (e.g., electrical, fiber optic, hydraulic, etc.), surveillance lines, drill bits and reamers, sensors or distributed sensors, downhole heat exchangers, valves and corresponding actuation devices, tool seals, packers, cement plugs, bridge plugs, and other wellbore isolation devices, or components, and the like. Any of these components may be included in the systems generally described above and depicted in FIG. 2.

In one embodiment, the disclosure provides a system comprising: a mixing tank, the mixing tank comprising a low-polymer-load fracturing fluid that comprises an aqueous carrier fluid, optionally proppant, and a mesh network created by polymers crosslinking between and/or among polymer-treated degradable fibers that have been at least partially treated with a polymer on the fiber surface; a well head; a tubular; and a high pressure pump. Further components may include, but are not limited to, wellbore casing, wellbore liner, completion string, insert strings, drill string, coiled tubing, slickline, wireline, drill pipe, drill collars, mud motors, downhole motors and/or pumps, surface-mounted motors and/or pumps, centralizers, turbolizers, scratchers, floats (e.g., shoes, collars, valves, etc.), logging tools and related telemetry equipment, actuators (e.g., electromechanical devices, hydromechanical devices, etc.), sliding sleeves, production sleeves, plugs, screens, filters, flow control devices (e.g., inflow control devices, autonomous inflow control devices, outflow control devices, etc.), couplings (e.g., electro-hydraulic wet connect, dry connect, inductive coupler, etc.), control lines (e.g., electrical, fiber optic, hydraulic, etc.), surveillance lines, drill bits and reamers, sensors or distributed sensors, downhole heat exchangers, valves and corresponding actuation devices, tool seals, packers, cement plugs, bridge plugs, and other wellbore isolation devices, or components, and the like. Any such embodiments may have one or more of the following additional elements in any combination: a polymer load of about 0.1 lbs/1000 gallons to about 15 lbs/1000 gallons; a gelled viscosity attributable to a mesh network; the polymer-treated degradable fibers comprising a fiber that comprises a degradable polymer selected from the group consisting of: an aliphatic polyester; a poly(lactide); a poly(glycolide); a poly($\epsilon$-caprolactone); a poly(hydroxybutyrate); a polyanhydride; an aliphatic polycarbonate; a poly(orthoester); a poly(amide); a poly(urethane); a poly(hydroxy ester ether); and a poly(phosphazene); the polymer-treated degradable fibers have an average or effective diameter of about 2 microns to about 200 microns, and a length of at least about 1 millimeter; the crosslinkable, hydratable polymer comprises a polymer selected from the group consisting of: a biopolymer, a synthetic polymer, xanthan, scleroglucan, succinoglycan, cellulose, a cellulose derivative, hydroxyethylcellulose, guar, a guar derivative, hydroxypropyl guar, carboxymethyl guar, carboxymethylhydroxyethyl guar, hydroxyethyl cellulose, carboxymethylhydroxyethyl cellulose, hydroxypropyl cellulose a polyacrylamide, and any combination thereof; the low-polymer-load fracturing fluid further comprises an external breaker, a pH-adjusting agent, a chelating agent, a biocide, a de-emulsifier, a surfactant, a salt, a crosslinking agent, a buffer, a clay inhibitor, an iron-control additive, an external breaker, caustic, a relative permeability modifiers, and any combination thereof; the carrier fluid comprises a fluid selected from the group consisting of: a gas, water, fresh water, salt water, brine and seawater; and the proppant particulates comprise proppant particulates selected from the group consisting of: graded sand, bauxite, a ceramic material, a glass material, a walnut hull, a polymer bead, and any combination thereof.

In one embodiment, the disclosure provides a system comprising: a mixing tank, the mixing tank comprising a low-polymer-load fracturing fluid that comprises an aqueous carrier fluid, optionally proppant, and a mesh network created by polymers crosslinking between and/or among polymer-treated degradable fibers that have been at least partially treated with a polymer on the fiber surface; a well head; a tubular having an orifice through which the low-polymer-load fracturing fluid can be placed into a subterranean formation matrix; and a high pressure pump.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope and spirit of the present invention. The invention illustratively disclosed herein suitably may be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces. If there is any conflict in the usages of a word or term in this specification and one or more patent or other documents that may be incorporated herein by reference, the definitions that are consistent with this specification should be adopted.

The invention claimed is:

1. A method comprising:
providing a low-polymer-load fracturing fluid consisting of an aqueous carrier fluid, proppant, and polymer-treated degradable fibers that have been treated with a crosslinkable, hydratable polymer on the fiber surface, the low-polymer-load fracturing fluid having an initial viscosity;
placing the low-polymer-load fracturing fluid into a portion of a subterranean formation at a rate to generate pressure above fracture gradient to form or enhance at least one fracture in the portion of the subterranean formation;
placing the low-polymer-load fracturing fluid into the fracture and after placing the low-polymer-load fracturing fluid into the fracture, crosslinking the polymer to form crosslinks between the polymer-treated degradable fibers so as to increase the viscosity of the low-polymer-load fracturing fluid to a gelled viscosity, the gelled viscosity being higher than the initial viscosity; and
allowing the polymer-treated degradable fibers to degrade so that the viscosity of the low-polymer-load fracturing fluid is reduced to a broken viscosity, the broken viscosity being lower than the gelled viscosity of the low-polymer-load fracturing fluid,
wherein the polymer-treated degradable fibers have an average or effective diameter of about 2 microns to about 200 microns, and a length of at least about 1 millimeter.

2. The method of claim 1 wherein the low-polymer-load fracturing fluid has a polymer load of about 0.1 lbs/1000 gallons to about 15 lbs/1000 gallons.

3. The method of claim 1 wherein the gelled viscosity is attributable to a mesh network.

4. The method of claim 1 wherein the polymer-treated degradable fibers comprise a fiber that comprises a degradable polymer selected from the group consisting of: an aliphatic polyester; a poly(lactide); a poly(glycolide); a poly($\epsilon$-caprolactone); a poly(hydroxybutyrate); a polyanhydride; an aliphatic polycarbonate; a poly(orthoester); a poly(amide); a poly(urethane); a poly(hydroxy ester ether); a poly(phosphazene); a derivative thereof; and a combination thereof.

5. The method of claim 1 further comprising before providing the low-polymer-load fracturing fluid, providing a highly viscous concentrate that comprises the polymer-treated degradable fibers and an aqueous carrier fluid and mixing the polymer-treated degradable fibers to form a low-polymer-load fracturing fluid.

6. The method of claim 1 further comprising before providing the low-polymer-load fracturing fluid, providing spray-coated polymer-treated degradable fibers and providing an aqueous carrier fluid, and mixing the spray-coated polymer-treated degradable fibers with the aqueous carrier fluid to form a low-polymer-load fracturing fluid.

7. The method of claim 1 wherein the crosslinkable, hydratable polymer comprises a polymer selected from the group consisting of: a biopolymer, a synthetic polymer, xanthan, scleroglucan, succinoglycan, cellulose, a cellulose derivative, hydroxyethylcellulose, guar, a guar derivative, hydroxypropyl guar, carboxymethyl guar, carboxymethylhydroxyethyl guar, hydroxyethyl cellulose, carboxymethylhydroxyethyl cellulose, hydroxypropyl cellulose a polyacrylamide, and any combination thereof.

8. The method of claim 1 wherein the low-polymer-load fracturing fluid further comprises an external breaker, a pH-adjusting agent, a chelating agent, a biocide, a de-emulsifier, a surfactant, a salt, a crosslinking agent, a buffer, a clay inhibitor, an iron-control additive, caustic, a relative permeability modifiers, or any combination thereof.

9. The method of claim 1 wherein the proppant particulates comprise proppant particulates selected from the group consisting of: graded sand, bauxite, a ceramic material, a glass material, a walnut hull, a polymer bead, and any combination thereof.

10. The method of claim 1 wherein the carrier fluid comprises a fluid selected from the group consisting of a gas, water, fresh water, salt water, brine and seawater.

11. A method comprising:
providing a low-polymer-load fracturing fluid consisting of an aqueous carrier fluid, proppant, and polymer-treated degradable fibers that have been treated with a crosslinkable, hydratable polymer on the fiber surface, wherein the polymer-treated degradable fibers have an average or effective diameter of about 2 microns to about 200 microns, and a length of at least about 1 millimeter;

introducing the low-polymer-load fracturing fluid into a subterranean formation penetrated by a wellbore at a pressure sufficient to create or enhance a fracture in the subterranean formation;

after placing the low-polymer-load fracturing fluid into the subterranean formation, crosslinking the polymer to form crosslinks between the polymer-treated degradable fibers so as to increase the viscosity of the low-polymer-load fracturing fluid to a gelled viscosity, the gelled viscosity being higher than the initial viscosity; and allowing the low-polymer-load fracturing fluid to form a proppant matrix in the fracture.

12. The method of claim 11 wherein the low-polymer-load fracturing fluid has a polymer load of about 0.1 lbs/1000 gallons to about 15 lbs/1000 gallons.

13. The method of claim 1 wherein the polymer-treated degradable fibers comprise a fiber that comprises a degradable polymer selected from the group consisting of: an aliphatic polyester; a poly(lactide); a poly(glycolide); a poly(ε-caprolactone); a poly(hydroxybutyrate); a polyanhydride; an aliphatic polycarbonate; a poly(orthoester); a poly(amide); a poly(urethane); a poly(hydroxy ester ether); and a poly(phosphazene).

14. The method of claim 11 further comprising before providing the low-polymer-load fracturing fluid, providing a highly viscous concentrate that comprises the polymer-treated degradable fibers and an aqueous carrier fluid and mixing the polymer-treated degradable fibers to form a low-polymer-load fracturing fluid at a well site.

15. The method of claim 11 further comprising before providing the low-polymer-load fracturing fluid, providing spray-coated polymer-treated degradable fibers and providing an aqueous carrier fluid, and mixing the spray-coated polymer-treated degradable fibers with the aqueous carrier fluid to form a low-polymer-load fracturing fluid at a well site.

16. The method of claim 11 wherein the crosslinkable, hydratable polymer comprises a polymer selected from the group consisting of: a biopolymer, a synthetic polymer, xanthan, scleroglucan, succinoglycan, cellulose, a cellulose derivative, hydroxyethylcellulose, guar, a guar derivative, hydroxypropyl guar, carboxymethyl guar, carboxymethylhydroxyethyl guar, hydroxyethyl cellulose, carboxymethylhydroxyethyl cellulose, hydroxypropyl cellulose a polyacrylamide, and any combination thereof.

* * * * *